(12) United States Patent
Van De Wall

(10) Patent No.: US 9,331,630 B2
(45) Date of Patent: May 3, 2016

(54) OUTSIDE WALL CLADDING ELEMENT AND AN OUTSIDE WALL PROVIDED WITH SUCH AN OUTSIDE WALL CLADDING ELEMENT

(75) Inventor: Wilhelmus Josephus Alex Van De Wall, Heeze (NL)

(73) Assignee: WALLVISION B.V., Heeze (NL)

( * ) Notice: Subject to any disclaimer, the term of this patent is extended or adjusted under 35 U.S.C. 154(b) by 87 days.

(21) Appl. No.: 14/342,913

(22) PCT Filed: Sep. 5, 2012

(86) PCT No.: PCT/NL2012/050613
§ 371 (c)(1),
(2), (4) Date: Mar. 5, 2014

(87) PCT Pub. No.: WO2013/036112
PCT Pub. Date: Mar. 14, 2013

(65) Prior Publication Data
US 2015/0222223 A1    Aug. 6, 2015

(30) Foreign Application Priority Data

Sep. 5, 2011 (NL) .................................. 2007358
Jun. 29, 2012 (NL) .................................. 2009089

(51) Int. Cl.
*F24J 2/00* (2014.01)
*H02S 20/26* (2014.01)
(Continued)

(52) U.S. Cl.
CPC ............... *H02S 20/26* (2014.12); *F24J 2/0444* (2013.01); *F24J 2/1047* (2013.01); *F24J 2/1057* (2013.01); *F24J 2/16* (2013.01); *G02B 5/003* (2013.01); *G02B 5/09* (2013.01); *G02B 5/208* (2013.01);
(Continued)

(58) Field of Classification Search
CPC .......... H02S 20/26; G02B 5/09; G02B 7/183; G02B 5/208; G02B 19/0019; G02B 5/003; G02B 19/0042
USPC ............................................. 52/202; 126/702
See application file for complete search history.

(56) References Cited

U.S. PATENT DOCUMENTS 246,626 A * 9/1881 Morse ........................... 126/628
2,874,612 A * 2/1959 Luboshez ..................... 359/596
(Continued)

FOREIGN PATENT DOCUMENTS

DE           3419299 A1    11/1985
DE      102005054645 A1     5/2007
(Continued)

OTHER PUBLICATIONS

International Search Report, dated Dec. 12, 2012, from corresponding PCT application.

*Primary Examiner* — Basil Katcheves
*Assistant Examiner* — Joshua Ihezie
(74) *Attorney, Agent, or Firm* — Young & Thompson

(57) ABSTRACT

Disclosed is an outside wall cladding element for cladding an outside wall (6). The outside wall cladding element includes a structure (1) of a panel-shaped material and fastening elements to be mounted on the outside wall, in which the panel-shaped material includes a zigzag or wave-shaped element (1), and is provided with a bottom side (4) and a top side (5), in which the bottom side and the top side of the zigzag-shaped element make an angle δ (delta) with one another which is in a range between 50 to 130 degrees, and in which a side (4) includes a light-absorbing layer and another side (5) includes a light-reflecting layer.

16 Claims, 8 Drawing Sheets

(51) Int. Cl.
*F24J 2/04* (2006.01)
*F24J 2/10* (2006.01)
*F24J 2/16* (2006.01)
*H02S 40/22* (2014.01)
*G02B 5/00* (2006.01)
*G02B 5/09* (2006.01)
*G02B 5/20* (2006.01)
*G02B 7/183* (2006.01)
*G02B 19/00* (2006.01)
*E04F 13/08* (2006.01)

(52) U.S. Cl.
CPC ............ *G02B 7/183* (2013.01); *G02B 19/0019* (2013.01); *G02B 19/0042* (2013.01); *H02S 40/22* (2014.12); *E04F 13/0803* (2013.01); *E04F 13/0871* (2013.01); *F24J 2002/1071* (2013.01); *Y02B 10/20* (2013.01); *Y02E 10/44* (2013.01); *Y02E 10/52* (2013.01)

(56) References Cited

U.S. PATENT DOCUMENTS

| | | | | |
|---|---|---|---|---|
| 3,338,730 A | * | 8/1967 | Slade et al. | 428/142 |
| 3,982,527 A | * | 9/1976 | Cheng et al. | 126/690 |
| 4,141,340 A | * | 2/1979 | Niedermeyer | 126/658 |
| 4,222,368 A | * | 9/1980 | Rost et al. | 126/600 |
| 4,264,664 A | * | 4/1981 | Kunz | 428/142 |
| 4,271,819 A | * | 6/1981 | Farrell | 126/623 |
| 4,323,054 A | * | 4/1982 | Hummel | 126/631 |
| 4,337,754 A | * | 7/1982 | Conger | 126/618 |
| 4,410,757 A | * | 10/1983 | Stamminger et al. | 136/248 |
| 4,480,633 A | * | 11/1984 | Farrell | 126/623 |
| 4,498,455 A | * | 2/1985 | Gramm | 126/569 |
| 4,534,336 A | * | 8/1985 | Ladriere | 126/633 |
| 4,715,358 A | * | 12/1987 | Koster | 126/702 |
| 5,092,101 A | * | 3/1992 | Kunert | 52/786.11 |
| 5,511,537 A | * | 4/1996 | Hively | 126/702 |
| 8,028,691 B2 | * | 10/2011 | Maxson et al. | 126/702 |
| 8,689,490 B2 | * | 4/2014 | Sumner | 52/1 |
| 8,898,968 B2 | * | 12/2014 | Keller | 52/173.3 |
| 8,978,322 B2 | * | 3/2015 | Elliott et al. | 52/173.3 |
| 2001/0008144 A1 | * | 7/2001 | Uematsu et al. | 136/246 |
| 2010/0177380 A1 | * | 7/2010 | Nagahama et al. | 359/359 |
| 2010/0181014 A1 | * | 7/2010 | Raymond et al. | 156/209 |
| 2011/0019174 A1 | * | 1/2011 | Soer et al. | 355/71 |

FOREIGN PATENT DOCUMENTS

| | | |
|---|---|---|
| DE | 202007017775 A2 | 3/2009 |
| EP | 1 724 842 A2 | 11/2006 |
| GB | 2 324 098 A | 10/1998 |
| WO | 2008/010250 A2 | 1/2008 |

\* cited by examiner

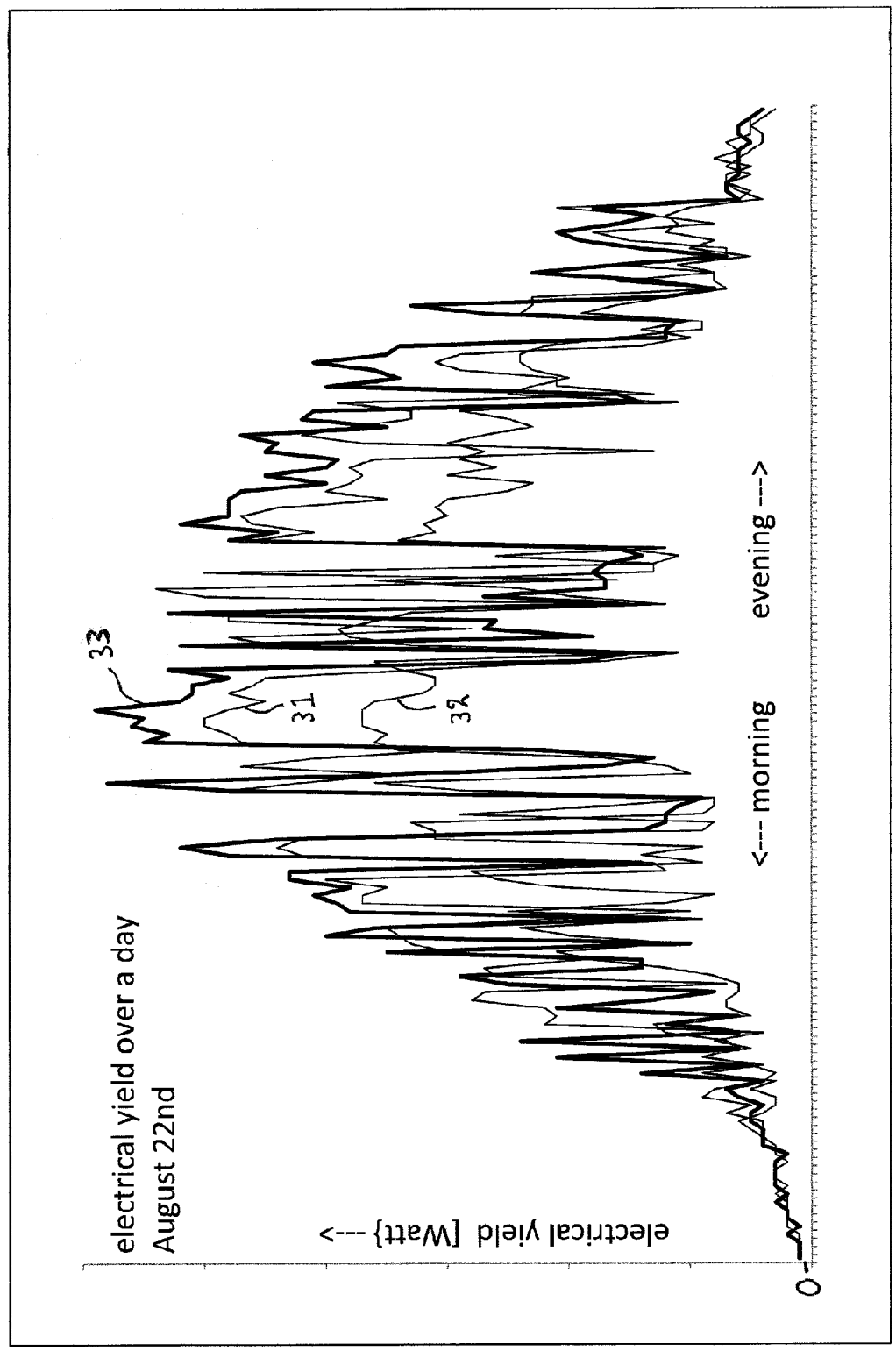

OUTSIDE WALL CLADDING ELEMENT AND AN OUTSIDE WALL PROVIDED WITH SUCH AN OUTSIDE WALL CLADDING ELEMENT

The present invention relates to an outside wall cladding element for cladding an outside wall comprising a structure which is to be attached to an outside wall and comprises a panel-shaped material and fastening elements. Furthermore, the invention relates to an outside wall provided with such an outside wall cladding element and a method for mounting an outside wall cladding element.

Such an outside wall cladding element is known from the Dutch patent 2003092. In the known outside wall cladding element, horizontal rows of solar panels mounted one above the other are fitted to a vertical structure, for example a wall, at an inclined angle of between 20 and 70 degrees. The forces of the wind on the solar panels and those of the weight of the solar panels are transferred to the vertical structure by the triangular holder system. In this case, the inclined side of the triangle runs parallel to the solar panels and the other sides of the triangle are formed by a vertical part which is attached to the vertical structure and by a horizontal part. In this case, it is assumed that in this way the solar panels receive the largest amount of solar energy throughout the year. The distance between the rows of solar panels is chosen to be such that the rows of solar panels which are fitted relatively high will only throw a limited shadow on the row of solar panels situated underneath, even at the highest altitude of the sun. However, the known outside wall cladding element does not make efficient use of the sunlight which reaches the building in the space between the rows of solar panels. The sunlight which falls between the rows of solar panels when the sun's altitude is low will not reach the solar cells. This sunlight cannot be used to produce electricity.

It is an object of the invention to provide an outside wall cladding element by means of which the solar radiation on an outside wall can be used to the largest possible degree.

It is another object to provide an outside wall cladding element which reflects the solar radiation away from the building as much as possible when it is hot and absorbs the solar radiation into the building as much as possible when it is cold.

It is a further object to provide a method of limiting loss of energy through long-wave radiation of an outside wall of a building.

It is yet a further object to provide a method to use the solar radiation on the outside wall as much as possible, in which case the aesthetic freedom of design of the resulting appearance of the outside wall is limited as little as possible.

According to the invention, at least one of the abovementioned objects is achieved by an outside wall cladding element in which the panel-shaped material comprises a zigzag-shaped or wave-shaped element and is provided with a bottom side and a top side, wherein the bottom side and top side of the zigzag-shaped element make an angle with one another which is in the range between 50 to 130°, and wherein one side comprises a light-absorbing layer and another side comprises a light-reflecting layer.

It is customary to construct a vertical outside wall on the outside of buildings which is of aesthetic appeal and has a number of additional structural functions. The following functions are given by way of example: long-term protection of the building against mechanical load, protection against rain, hail, snow, wind, sunlight, condensation, damping of sound, limiting heat loss on cold days and limiting heating up on hot days.

Outside walls are attached to a building by means of a supporting structure. On top of or on this supporting structure, outside wall materials are arranged. In addition, it is possible to use elements, such as for example thermal insulation materials, damp-proof films, breather films and fire-resistant elements in the construction of the outside wall. In many cases, a cavity is created directly behind the outside wall materials. Often, ventilation openings are used in the outside wall structure.

Many different materials may be used as outside wall materials. Examples are brick, glass, metal plates, concrete elements, metal laminates, fibre cement panels, HPL compact panels, glass fibre-reinforced composites, wooden parts and wood-based materials. These materials may be coated, printed, textured, shaped, perforated or treated in any other way. Many outside wall materials are panel-shaped materials. The aesthetic appeal is an important factor in the choice of outside wall materials.

The desire to build in an energy-efficient way has resulted in the use of different energy-efficient outside wall solutions. A number of these outside wall solutions use the energy of the sunlight which is incident on an outside wall.

In an embodiment, outside wall materials with a high light reflectance can be used. These result in a low absorption of sunlight by the outside wall and thus lead to a reduced cooling load of the building during times when it is sunny and warm during the year. A high light reflectance is achieved by using light colours and by using pigments which have a high light reflectance in the infrared range. In order to achieve a high sunlight reflectance, it is possible, for example, to choose materials for the outside wall in which pigments or fillers are used on the surface such as titanium dioxide, titanates, vanadates, barium sulphate, zinc oxide, glass pearls, metallic pigments, mother-of-pearl-pigments, mica pigments, quartz, pigment green 17, pigment brown 29, pigment brown 157, pigment black 12, Lumogen black FK4280 as supplied by BASF, Paliogen black L0086 as supplied by BASF, Sicopal black K0095 as supplied by BASF. In addition, use can be made of glossy materials and of metallic reflecting materials, such as metals, metal coatings and sunlight-reflecting films, such as for example Reflectech Mirror Film as supplied by Reflectec Inc. A drawback of the use of light-reflecting materials on a vertical outside wall is that this outside wall absorbs little sunlight on cold days and that it limits the aesthetic freedom of design. In addition, on a sunny day, a highly reflective vertical outside wall is an unpleasant experience for the eyes of passers-by.

In an embodiment of the outside wall cladding element, the light-reflecting side has an orientation which is such that it reflects this sunlight to a light-absorbing side of the structure situated nearby. According to the invention, the aesthetic freedom of design alternately using light-reflecting and light-absorbing layers on the bottom layer and the top layer of the zigzag-shaped element is retained.

Construction materials having a low emissivity are used to reduce loss of energy via long-wave radiation. In this context, emissivity means the relative value at which a surface of an object can transmit and receive radiation, as defined by Kirchhoff's law. A low emissivity may, for example, be achieved by means of metallic layers or transparent layers as used by Pilkington in the glass of its Activ Suncool glazing. The loss of energy due to long-wave radiation increases if the surface is oriented more towards heaven. A drawback of the use of materials with low emissivity in an outside wall is that it is less easy for solar heat to leave the building even in summer and also means a limitation of the aesthetic freedom of design. Long-wave radiation has wavelengths which are much larger than the wavelengths which are present in sunlight. The principles defining the loss of energy due to longwave radiation differ from the principles which apply to absorption and reflection of sunlight. Both principles are described in the book "Zonnestraling in Nederland" (Solar radiation in the Netherlands) by C.A. Velds, ISBN 90-5210-140-X.

In an embodiment, outside wall materials with a high degree of absorption of sunlight can be used. These materials result in a higher temperature of the outside wall materials and thus in a reduced energy requirement for heating these buildings at times when the outside wall temperature is higher than the inside temperature. A high absorption of sunlight can be achieved by using dark colours. Mainly colours containing many soot pigments have a high degree of absorption of sunlight. A drawback of using colours absorbing sunlight on a vertical outside wall is that this results in a higher cooling load on hot days and limits the aesthetic freedom of design.

It is known that less solar energy is passed on to the interior of a building if the ventilating action in the cavity is increased, for example, by increasing the cavity depth, increasing the number of ventilation openings or by enlarging the ventilation openings. A drawback of increasing the depth of the cavity is that the outside wall structure becomes thicker, so that the building requires a larger base surface area. Furthermore, the supporting structure becomes more expensive as more supporting material is required. Increasing the number of openings or enlarging the size of the ventilation openings results in a greater risk of leakage and of vermin, such as insects, penetrating into the outside wall structure.

In an embodiment of the outside wall cladding element, the light-absorbing layer is provided with solar cells or solar collectors. Solar cells, solar panels and solar collectors are used in vertical outside walls. Solar cells, solar collectors and solar panels are dark, often virtually black, in colour in order to absorb the greatest possible amount of sunlight. These solar cells and solar collectors can be installed vertically on the supporting structure. A drawback of this vertical installation is that the aesthetic freedom of design is greatly limited and that the energy efficiency of vertically installed solar cells, solar panels or solar collectors is relatively low.

It is known to install solar panels, materials comprising solar cells and solar collectors preferably at that angle of inclination which has been chosen on the basis of the most favourable altitude of the sun averaged over a year. In the Netherlands, a panel in a vertical position on a south-facing outside wall only receives approximately 70% of a panel with optimum south-facing orientation at an angle of inclination of approximately 35 degrees.

It is known from, inter alia, DE 102005054645, DE 202007017775, DE 3419299, DE 20200601611 and WO 2008/010250 to install solar panels at an inclined angle in rows one above the other to a vertical structure in order thus to achieve the highest possible energy yield. A drawback of these solutions is that the sunlight which reaches the building between the rows of solar panels at a low altitude of the sun is lost for the production of electrical energy. If, with these solutions, the loss is compensated for by installing the rows of solar panels closer together, losses occur at high altitude of the sun since the rows of solar panels which are situated at the top cast a shadow on the rows of solar panels situated at the bottom. When viewed from below at street level, it is the bottom side of the known structures which is seen.

At the same solar radiation, the electrical yield of the most common types of solar cells and solar panels becomes lower as the temperature of these elements increases. It is therefore important to dissipate as much as possible of the heat from these elements. The heat can, for example, be dissipated by thermal conduction to a cooler object or medium or by ventilation, both at the front and at the back of these elements.

The annual trajectory of the sun is known. It is possible to calculate the position of the sun relative to the earth at different times of the day, at different dates during the year and at a chosen location on earth. It is also possible to calculate how much solar radiation a surface with a chosen orientation (azimuth and angle of inclination) receives on average at a chosen time, date and location. From these observations, it follows that the sun, on average, is at a low altitude during the hours when the building requires heating. During these hours, the solar radiation can make a positive contribution to heating of the building. It can also be concluded that the sun, averaged over the year, is at a high altitude during those hours when the solar heat causes an undesired solar load and the building requires cooling in order to maintain an agreeable indoor temperature.

The invention furthermore relates to an outside wall provided with a coating member according to Claim 15 and a method for mounting an outside wall cladding element according to Claim 16 on an outside wall.

Further advantageous embodiments are defined in the dependent claims.

The invention is explained in more detail by way of example by means of the following description in which reference is made to the attached drawing, in which:

as illustrated in FIG. 4;

Figure 6:
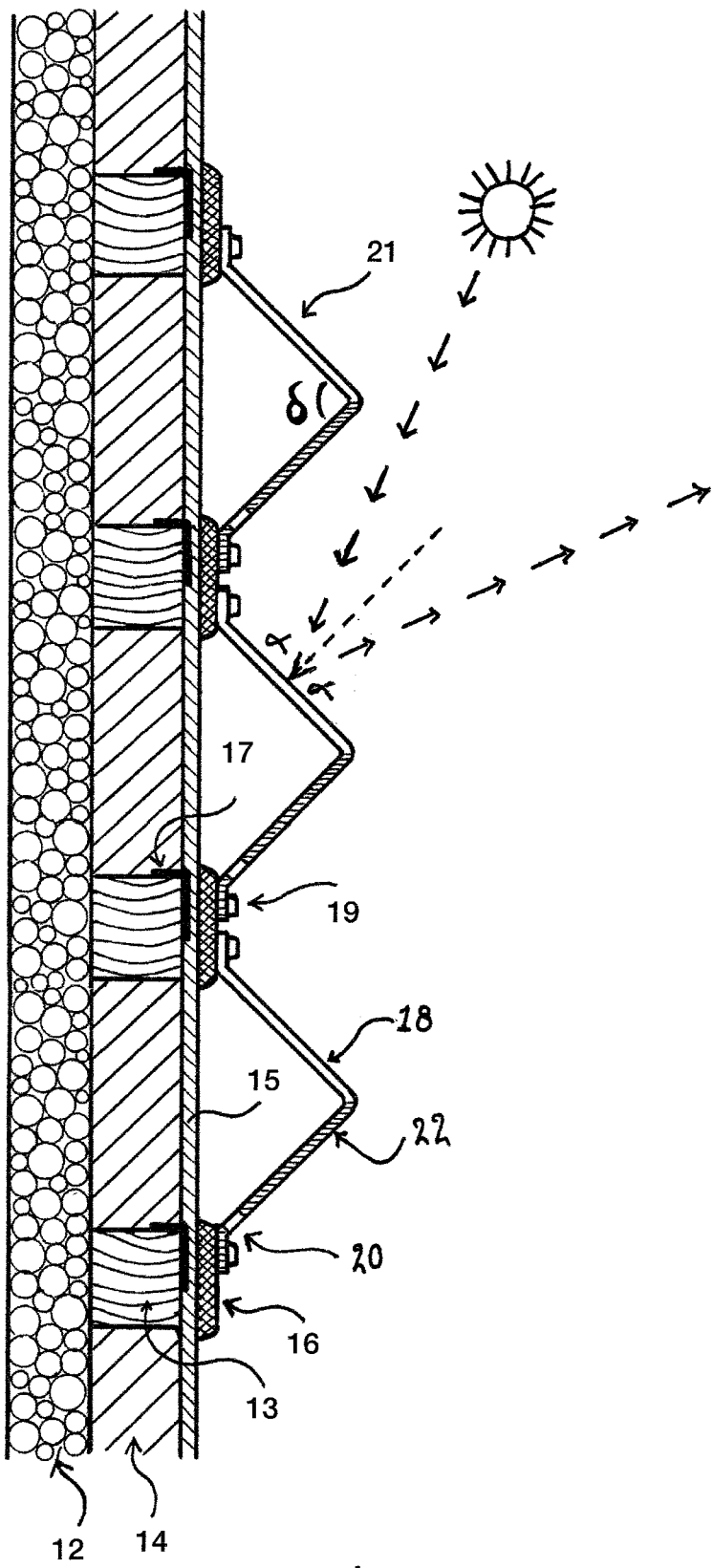
FIG. 6 shows the cross section of an outside wall with an alternative outside wall cladding element fitted thereto with respect to the element from FIG. 1.
Figure 7:
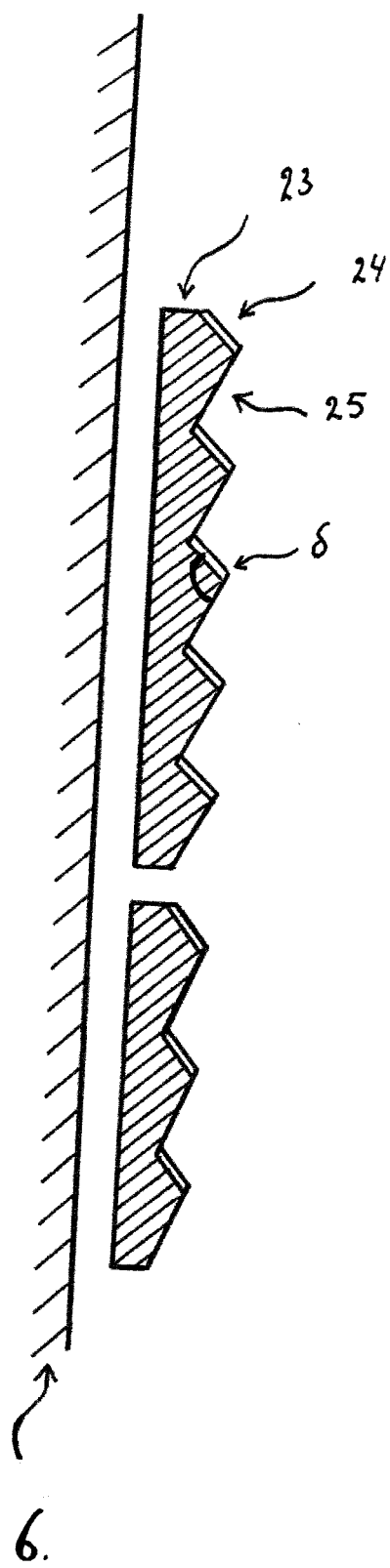
Figure 8:
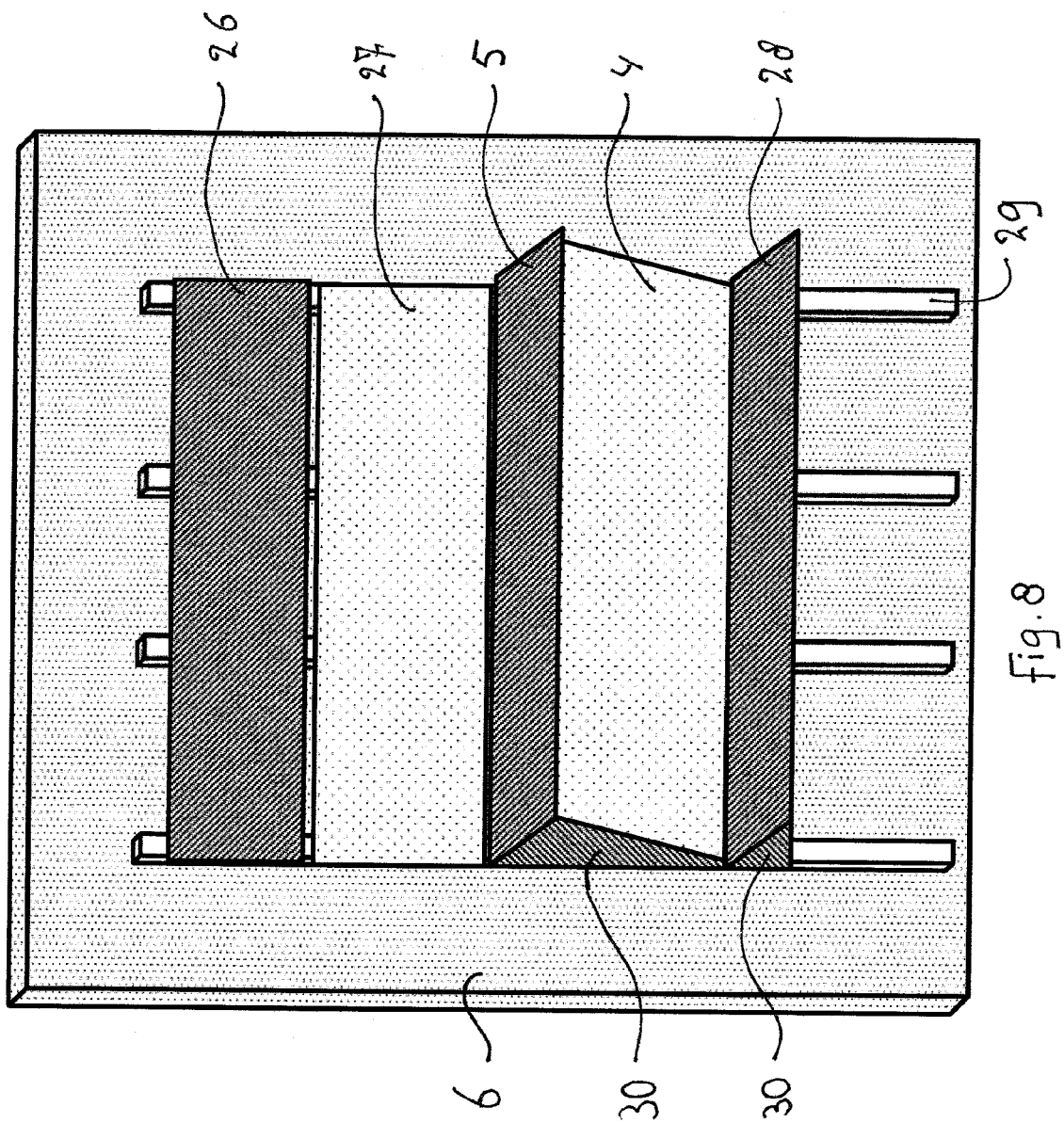

FIG. 7 diagrammatically shows the combination of sunlight-reflecting surfaces and sunlight-absorbing surfaces as also illustrated in FIG. 6, FIG. 8 shows the arrangement according to Example 1 and FIG. 9 shows a graph of the electrical yield according to Example 1.

Figure 1:
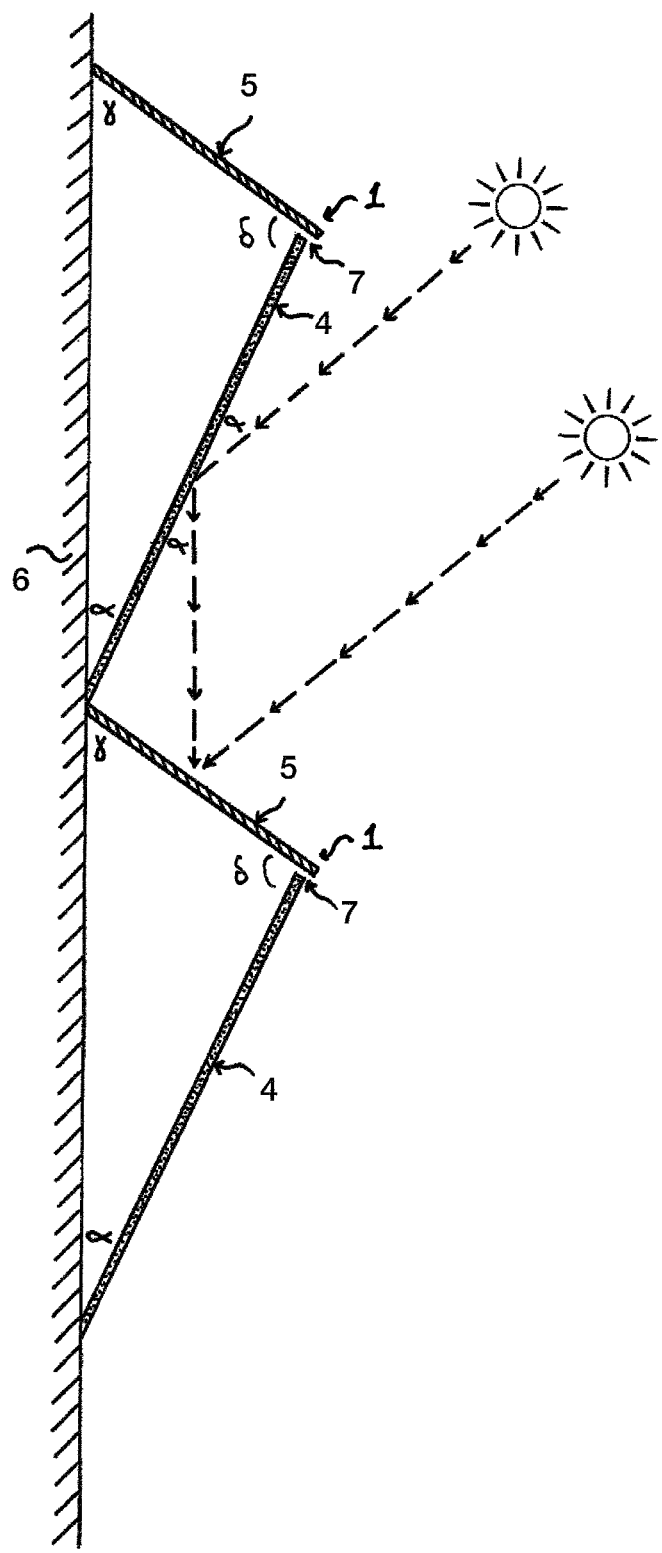
FIG. 1 shows an outside wall with a zigzag-shaped outside wall cladding element fitted thereto.

FIG. 1 shows an outside wall 6 with an outside wall cladding element fitted thereto. The outside wall cladding element comprises a structure which is fitted to the outside wall and consists of a panel-shaped material which is fitted or formed in a zigzag shape and is provided with a bottom side 4 and a top side 5, in which the bottom side and top side of the zigzag-shaped element make an angle δ (delta) with one another which is in the range between 50 to 130 degrees. In an embodiment, the bottom side 4 of the zigzag-shaped outside wall cladding element may be provided with a light-reflecting layer, for example, which comprises a material with a relatively high light-reflecting property, for example a white colour, a retro-reflective effect, a metallic effect, a reflective film. The top side 5 may be provided with a light-absorbing layer. In an embodiment, the top side of the light-absorbing layer 5 may be provided with solar collectors, solar panels, materials comprising solar cells, vegetation or surfaces having an emissivity which is less than 30%.

In an embodiment, the bottom side of the absorbing layer 5 may comprise a material which absorbs the sunlight to the greatest possible degree. This may be materials with a high absorption coefficient for sunlight.

In an embodiment, the angle δ (delta) is in the range between 80 to 105 degrees.

Figures 4, 5:
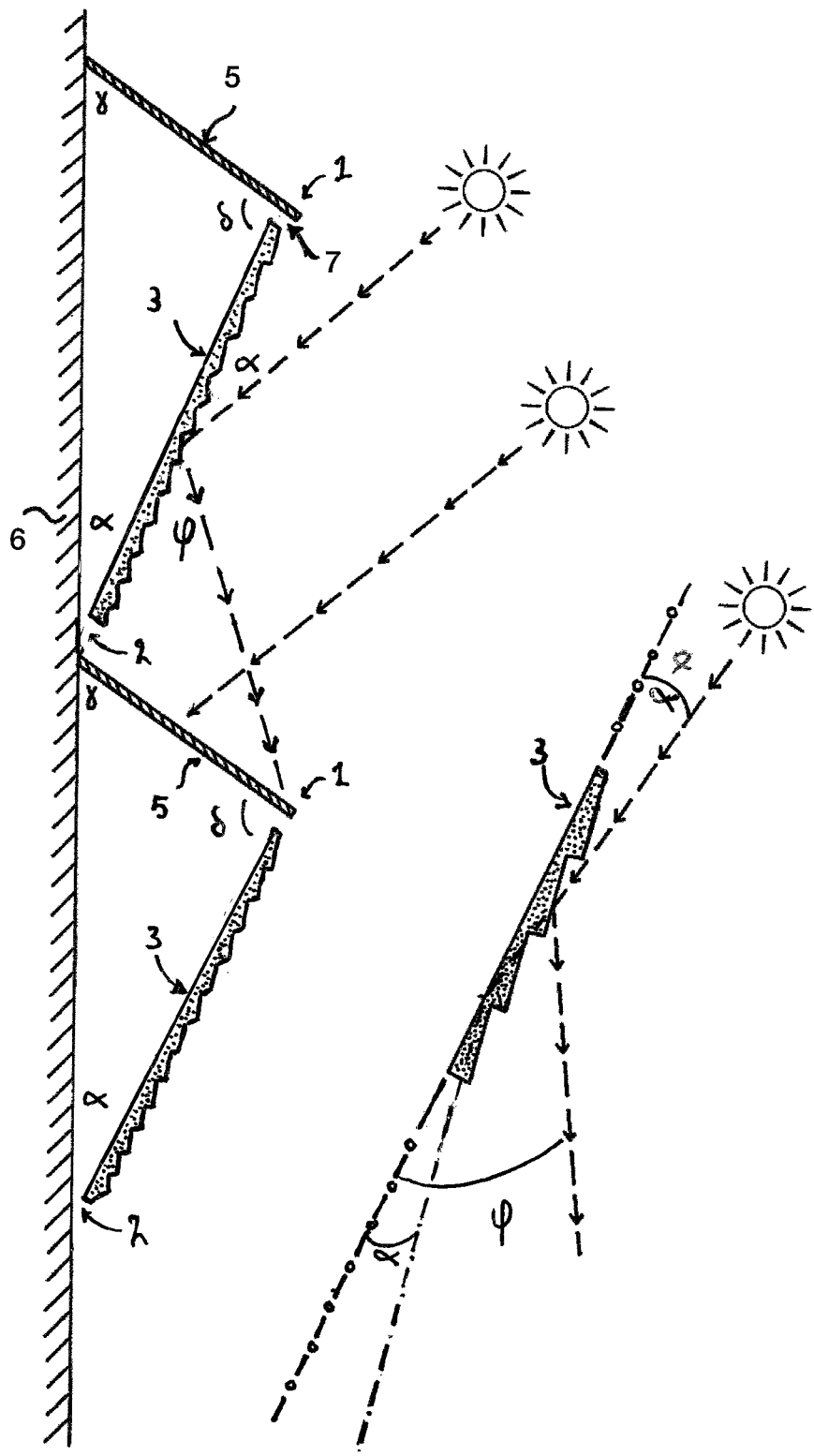
FIG. 4 shows an alternative according to FIG. 1, in which the sunlight-reflecting element has been replaced by a sunlight-reflecting element with a texture as illustrated in FIG. 5.
FIG. 5 shows the sunlight-reflecting element.

In another embodiment of the outside wall cladding element, the bottom side of the zigzag-shaped structure may be provided with a reflecting layer which comprises a material which has a high reflectivity to sunlight and is thus capable of reflecting the incident sunlight to the top sides of the zigzag shape situated nearby. The panels with these reflecting layers may be configured to reflect incident sunlight at an angle which differs from the angle of incidence of the sunlight. This angle dependency may, for example, be achieved by means of surface textures 3 by providing a knurled structure on the outside wall material or by oriented effect pigments as illustrated in FIGS. 4 and 5.

By providing these outside wall cladding elements with thermal insulation materials and ventilation systems, the undesired transport of this solar energy to the interior of the building can be limited. For the surfaces on the bottom side which are visible from street level, looking up, almost all possible colours and prints can be used, thus providing virtually unlimited aesthetic freedom of design with regard to colour, texture or choice of pattern.

According to the invention, transport means can be provided between the outside wall cladding element and the outside wall in order to conduct the absorbed solar energy to the interior of the building. The transport means may, for example, comprise ventilation means which can pass the hot air in the cavity behind the outside wall elements to the interior of the building. The transport means may also comprise thermal conductors which are directed towards the internal structure of the outside wall and which can be switched on and off as desired. These thermal conductors are preferably configured to be switchable so that energy can be prevented from leaking out of the building when it is relatively cold.

In an embodiment, outside wall cladding elements comprise a barrier to prevent fire flashover via the cavity between the storeys. This also makes it possible to use flammable materials in these outside wall cladding elements without this resulting in solutions which present a fire hazard.

For the sunlight-reflecting materials, it is possible to choose materials with wavelength-specific reflection which reflect sunlight at a wavelength of 500 to 700 nanometres and absorb infrared light having a wavelength of 1300 to 3000 nanometres. These wavelength-specific materials do reflect sunlight which is able to contribute to the electrical yield of a solar cell or solar panel and absorb those wavelengths which lead to undesired heating up of the solar cell or the solar panel. Wavelength-specific reflectors can, for example, be produced by providing sunlight-reflecting surfaces with a transparent top layer. Both glass and most transparent organic coatings absorb wavelengths of 1300 to 3000 nanometres. A thickness greater than 10 micrometres may already have a clear effect. For best results, transparent additives, such as for example, minerals can be added to the transparent layer.

In an embodiment, the outside wall cladding element according to FIG. 1 may be provided with ventilation openings 7.

It is possible to provide the top side 21 of the zigzag shape, as illustrated in FIG. 6, with materials which have an emissivity of less than 30%. This can be achieved, for example, by applying a metallic layer or a layer as applied by Pilkington to its Activ Suncool glass.

It is possible to choose the angles of the top sides and the bottom sides such that virtually no sunlight is reflected from the sunlight-reflecting side 21 to the sunlight-absorbing side 22.

In this description, a solar cell is understood to mean an element which can convert direct and indirect solar radiation into electrical energy. Furthermore, solar panels are understood to mean elements which contain solar cells. In addition, a solar collector is understood to mean an element which can convert the solar radiation so as to cause an increase in the temperature of these elements which can then be transferred to a medium, such as for example water, oil or air.

A panel-shaped material is understood to be an element, the thickness of which is at least 10 times smaller than the length and the width. The thickness of a plate material may vary from 0.5 to 2 times the average thickness. A plate material may be flat, but also bent, textured, perforated or treated in another way. Within the context of the present invention, a solar cell, solar collector or solar panel can be regarded as plate material.

Figure 2:
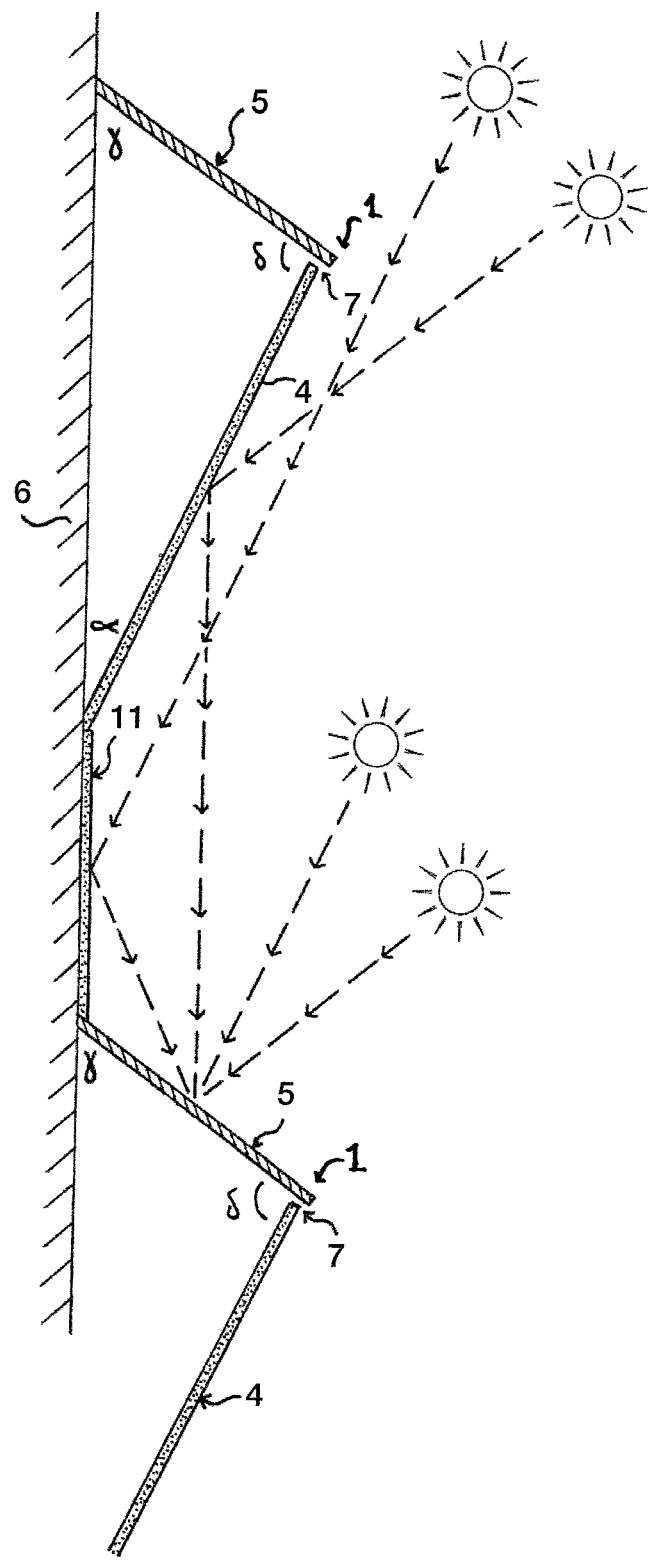
FIG. 2 shows an alternative according to FIG. 1.
Figure 3:
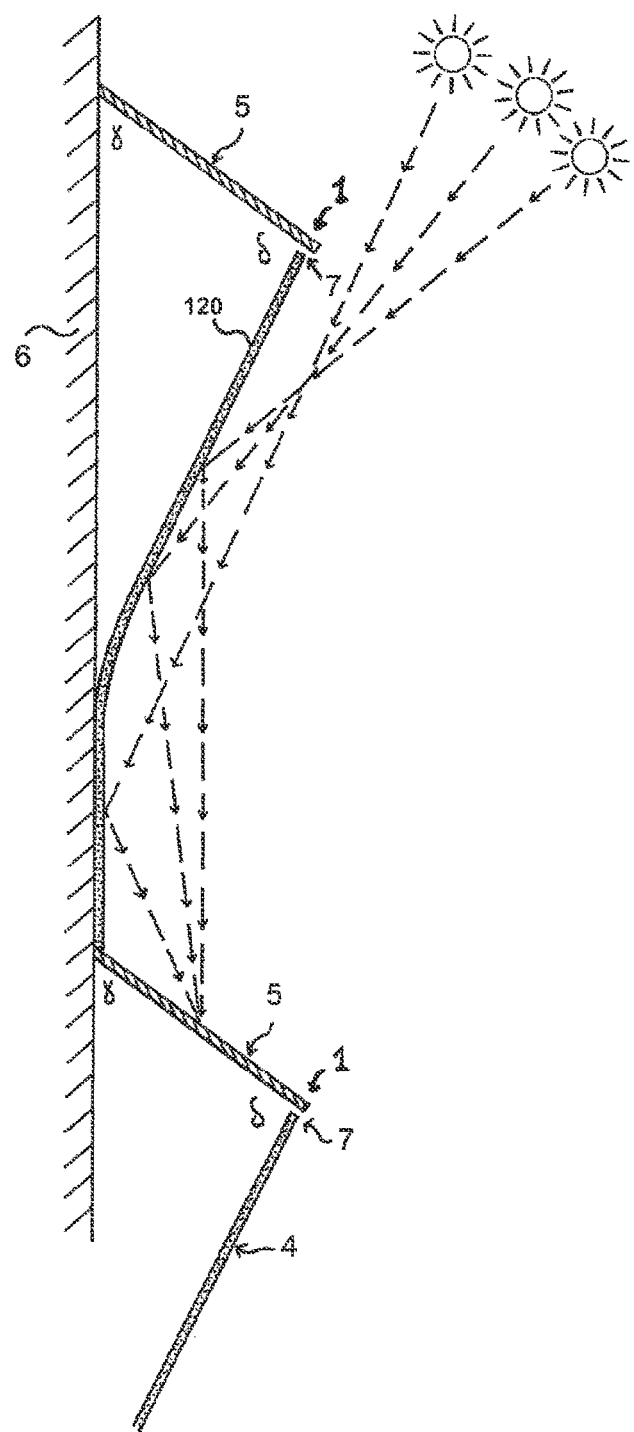
FIG. 3 shows an alternative according to FIG. 2.

The zigzag shape according to the invention may consist of a simple, vertically oriented, symmetrical and right-angled zigzag having an angle δ (delta) of 50-130 degrees preferably 80-105 degrees, in which case the panels 4 and 5 are approximately at right angles to one another, but zigzag shapes with legs of different lengths, different angles, rounded angles and zigzag shapes with vertical surfaces between the inclined surfaces are also possible. A particular form of zigzag is a wave form in which the angles of the zigzag are rounded, as is illustrated in FIGS. 2 and 3. The surfaces on the bottom side of the zigzag shape are those surfaces whose normal line points to a spot on the floor. The surfaces on the top side of the zigzag are those surfaces whose normal line points upwards. A material which mainly absorbs sunlight has a reflection coefficient of less than 50% and will absorb more than 50% of the incident sunlight. A material which mainly reflects sunlight has a reflection coefficient of more than 50%.

According to the invention, a sunlight-reflecting side will reflect light to a sunlight-absorbing side if the position of the sun in the sky corresponds to the geometry and the materialization of the outside wall arrangement. A surface is referred to as textured if this surface is no longer flat, but has a design which comprises higher and lower sections. With a flat material, the angle of incidence α (alpha) of light equals the exit angle φ (phi).

In an embodiment of the outside wall cladding element, the light-reflecting layer reflects incident sunlight at an angle φ (phi) which deviates at least 3 degrees from the angle of incidence α (alpha) on average. With materials which have been given a hue of colour, it is possible to achieve a reflection which differs from the angle of incidence α (alpha). In materials which have been given a hue of colour, materials or shapes have been incorporated in the surface which have an orientation such that, although the surface of the material may be perfectly flat, the angle of reflection φ (phi) still differs from the angle of incidence α (alpha). Aesthetic freedom of design is understood to mean the possibility of using a wide range of visual forms in, for example, materials, colours, prints, textures or glossiness for the outside wall.

Without moving parts in an outside wall cladding element, the solar energy can be used as efficiently as possible all year round and thus reduce the energy consumption of the building. In contrast to known structures for solar panels which are fitted at an angle of inclination to an outside wall, such as for example known from patent NL2003092, the present invention has the advantage that the sunlight which falls between the rows of solar panels on the building at a low altitude of the sun, can also be used efficiently by reflecting it to the solar panels. A further advantage compared to the known structure is the fact that a passer-by who looks up to this outside wall with an outside wall cladding element according to the invention from street level will see a decorative material, whereas with the known systems, he/she would see the bottom side of a holder system which is not designed with aesthetics in mind. With the present invention, a freedom of aesthetic design and outside wall design remains.

As the outside wall consists of panels of different orientation, it is possible to design these in such a manner that the different panels can be detached, so that inspection and repair of the technical facilities in the space behind the outside wall cladding element is possible.

In an embodiment, the zigzag-shaped element may consist of a single plate material of a zigzag design or a wave design, in which the panels oriented in one direction are sunlight-reflecting and the panels oriented in the other direction are sunlight-absorbing. The length of the zigzag shape does not have to be more than a few millimetres, but may even be more than three metres. This design may be a surface texture of an outside wall material or a shape in which the outside wall material is made, such as for example an undulating or deformed panel of uniform thickness or a flat panel whose thickness was subsequently deformed in order to achieve the desired geometry. It is also possible to attach the panels with different functions to each other or to the substructure by means of gluing, painting, coating, screwing, nailing, welding, soldering or in another way.

The present invention can readily be combined with other outside wall functions, such as insulation, the transfer of the wind load from the outside wall to the building structure, the umbrella function to keep out rain and snow, the barrier function for keeping out vermin, the ventilation function for keeping insulation materials dry and drying them and for preventing and drying condensation in the outside wall. In addition, the outside wall cladding element may, for example, be combined with outside wall- and window-cleaning installations, with sun blinds and awnings, with rain water discharge, with lightning protection, with transportation of ventilation air and with daylight systems. The outside wall cladding element may be designed by architects in such a manner that it is sufficiently sound-proof, protected against earthquakes, able to withstand vandalism, able to withstand hail and sufficiently fire-proof.

The panels may be installed so as to be detachable in order to enable maintenance and repair of the different surfaces. With these detachable systems, solutions may be chosen which prevent theft of the elements or damage from vandalism.

FIG. 1 furthermore shows the outside wall cladding element which is fitted to a vertical wall 6. Sunlight which hits the sunlight-reflecting side at an angle α (alpha) will largely be reflected at the same angle α (alpha) to the sunlight-absorbing sides 5. In this way, the sunlight-absorbing sides 5 receive direct sunlight and indirect sunlight. In this outside wall, ventilation openings 7 are provided in order to be able to remove undesired heat and moisture. In this outside wall, a small overhang 1 with the sunlight-absorbing sides 5 is produced in order to prevent rain from entering. It will be clear that, if this zigzag shape is installed at a height above two metres from street level, a passer-by will see, in particular, the bottom side 4 of the zigzag shape and the top side 5 of the zigzag shape will be virtually invisible to him/her. This means that the choice of colour and material for the top side 5 is less relevant to the aesthetic appearance of the outside wall. The aesthetic appearance of the outside wall can largely be determined by the choice in material and colour of the bottom side 4 of the zigzag shape. If use is made of solar cells (not shown), these will be fitted in the sunlight-absorbing surface 5.

FIG. 2 shows an outside wall cladding element in which the same elements can be seen as in FIG. 1. In the outside wall cladding element, a vertical reflecting layer 11 is provided to increase the repetition height of this zigzag shape and to reflect sunlight from a great height to the sunlight-absorbing surfaces.

FIG. 3 shows an outside wall cladding element in which the same elements can be seen as in FIG. 2. In this figure, the sunlight-reflecting sides 4 and the vertical reflecting layer 11 from FIG. 2 are combined to form a single zigzag element 120.

FIG. 4 shows an outside wall cladding element in which the same elements can be seen as in FIG. 1. In the outside wall cladding element, the sunlight-reflecting element 4 has been replaced by a sunlight-reflecting element 3 with a texture as indicated in FIG. 5. Due to this texture, the angle of the reflected sunlight φ (phi) differs from the angle of the incident sunlight α (alpha). In this way, the sunlight can be reflected to another location on the sunlight-absorbing sides without having to adjust the angles and dimensions of the structure. In this figure, an additional ventilation opening 2 is shown.

FIG. 5 furthermore shows details of the sunlight-reflecting element 3 in which the angle of the reflected light φ (phi) differs from the angle of the incident light α (alpha).

FIG. 6 shows an outside wall structure provided with an outside wall cladding element according to the invention, which prevents sunlight radiating from a high altitude of the sun from being absorbed by the outside wall structure. Sunlight from high altitudes is reflected away from the outside wall as much as possible by the sunlight-reflecting side 21. A strip 18 of aluminium plate with a thickness of 1 mm and a width of 40 cm is bent to form an angle profile with a leg length of 19 cm and an angle of 90 degrees. On the outer side of this profile, a strip with a width of 1 cm is bent at an angle of 135 degrees to the profile. In this strip, holes with a diameter of 6 mm are drilled at an intermediate distance of 20 cm so that these profiles can be fixed to a wooden substructure 13 on an outside wall. At the top, the angle profiles are sprayed with a sunlight-reflecting white colour on one side 21 and with an aesthetically pleasing sunlight-absorbing dark-blue colour on the other side 22. At a distance of 1 cm from the bend for the fixing strip, on the blue side of the profile, small holes 19 with a diameter of 4 mm are drilled at an intermediate distance of in each case 1 cm. These profiles are fitted horizontally, one above the other, to a wooden substructure 13 of an outside wall, with water being prevented from leaking between the joints of the aluminium elements to the wooden substructure by the use of a rubber strip 16. The wooden substructure consists of beams having a thickness 13 of 12 cm*12 cm which are fitted horizontally at a centre-to-centre distance of 28.9 cm from each other to an inner wall 12, with a layer of insulating material 14 with a thickness of 12 cm between the horizontal beams providing sufficient thermal insulation of the building. Before fitting the aluminium elements, a breather film 15 is mounted so that the insulation material remains dry in the unlikely event of rain or in case of another type of leakage. Between the wooden substructure with breather film and the aluminium profiles with the rubber seal, a steel angle profile 17 is fitted along the entire length of the aluminium profiles. This steel angle profile 17 rests against the upper side of the wooden substructure 13 and protrudes 4 cm into the insulation material. This steel angle profile prevents fire flashover in the vertical direction via the space behind the aluminium profiles. The small holes in the aluminium profiles 20 provide ventilation in the space between these profiles and the inner wall 12 and thus prevent condensation problems or moisture build-up in the outside wall structure. The white sides 21 of the outside wall elements reflect the radiation of the sun at high altitude and thus limit the cooling load of the building. The radiation of the solar heat at a low solar angle is passed into the outside wall via the wooden substructure 13 and the fire profile 17.

FIG. 7 diagrammatically shows a zigzag-shaped element in which sunlight-reflecting sides 24 and sunlight-absorbing sides 25 are incorporated into a single textured panel 23. An HPL panel 23 with an average thickness of 10 mm is provided with a texture in the form of a zigzag shape with slightly rounded angles and a depth of 1 mm by means of a pressing process. The panel is provided with a dark-grey colour on in each case one side of the zigzag shape 25 and a white colour on the adjacent other side 24 of the zigzag shape. The grey sides make an angle of 40 degrees with the panel and the white sides make an angle of 40 degrees with the panel. The angle between the surfaces, the tip of the sawtooth, is 100 degrees. This panel is fitted to a south-facing outside wall as outside wall material, with the zigzag shape running in the horizontal direction. By being fitted in this way, the grey sides 25 do not receive any direct sunlight on the hottest and sunniest days of the year. They do not receive any sunlight on these days when the sun's altitude is at its maximum, because the sun's altitude is greater than 50 degrees to the horizontal axis on these days. The white sides 24 receive most sunlight on these hot and sunny days of the year and reflect these away from the building. At low altitude of the sun, the grey part of the zigzag shape receives most solar radiation and will largely absorb it, in which case this solar radiation contributes to the heating up of the building.

FIG. 8 shows an arrangement of the embodiment of a zigzag-shaped element according to FIG. 7. On a south-facing brick wall 6, four vertical, wooden beams 29 are fitted at a mutual distance of 60 cm. On these wooden beams, a supporting structure 30 made of plywood and pinewood is fitted on which solar panels can be mounted. Three solar panels are mounted one above the other. The top solar panel 26 is mounted vertically. The two bottom solar panels 5, 28 are mounted at an angle of 25 degrees like the top sides of a zigzag shape. Above the bottom solar panels, a glossy white HPL compact panel 4 is fitted as the bottom side of a zigzag shape, more particularly in such a manner that it has an angle of inclination of −65 degrees. Above the top solar panel, a glossy white HPL compact panel 27 is mounted vertically. Above this vertical compact panel, a solar panel 26 is mounted vertically. The HPL compact panel and the two inclined solar panels project equally far from the outside wall. The structure which is thus produced resembles the structure in FIG. 1. The dimensions of these solar panels are 33 cm*180 cm and they have a specified output of 80 Wp each. The glossy white HPL compact panel 27 has a thickness of 10 mm and a size of 180 cm*72 cm. Dataloggers were used for one year to determine the electrical yield of the solar panels. It was found that the vertically mounted solar panel produces less electrical energy during the entire year than the two inclined solar panels. The solar panel above which no glossy HPL compact panel has been fitted produces approximately the same amount of energy in the Netherlands during the months of June and July as the solar panel which does have a glossy white panel fitted above it. From August, the performance of the solar panel with the glossy white panel fitted above it starts to improve compared to the other inclined solar panel, because from then on, the maximum altitude of the sun is lower and the reflecting white panel thus effectively reflects sunlight to the solar panels.

FIG. 9 shows a graph which shows a first curve 33 of electricity produced by an inclined solar panel 28 provided with the sunlight-reflecting HPL panel 4, and a second curve 31 shows the electricity produced by an inclined solar panel without this panel 5. The graph shows that the inclined solar panel 28 which is provided with the sunlight-reflecting panel produces approximately 6% more electricity than the inclined solar panel without this panel 5. On a day in August, the vertically mounted solar panel 26 produces 35% less electricity than the inclined solar panel without HPL compact panel. The solar panel with an angle of inclination of 25 degrees which has a glossy white HPL compact panel fitted above it produces approximately 131 kWh/m²/year. The solar panel at the same angle of inclination, but without a glossy white panel produces approximately 101 kWh/m²/year. The solar panel which is mounted vertically produces approximately 78 kWh/m²/year.

The invention claimed is:

1. An outside wall cladding element for cladding an outside wall (6) comprising:
   a structure (1) which is to be attached to the outside wall and comprises a panel-shaped material and fastening elements,
   wherein the panel-shaped material comprises a zigzag-shaped or wave-shaped element (1) and is provided with a bottom side (4) and a top side (5),
   wherein the bottom side (4) and the top side (5) of the zigzag-shaped element make an angle δ (delta) with one another which is in the range between 50 to 130 degrees,
   wherein the top side (5) comprises a light-absorbing layer and the bottom side (4) comprises a light-reflecting layer, and
   wherein the light-reflecting layer reflects light with wavelengths between 500 to 700 nm and has an absorption coefficient of less than 50% for the light with the wavelengths between 500 to 700 nm and an absorption coefficient of more than 50% for infrared radiation with wavelengths between 1200 to 3000 nm.

2. The outside wall cladding element according to claim 1, wherein the bottom side (4) has an orientation that reflects light to an adjacent said top side (5) of the structure (1).

3. The outside wall cladding element according to claim 1, wherein the top side (5) is provided with solar cells or solar collectors.

4. The outside wall cladding element according to claim 1, wherein the angle δ (delta) is in the range between 80 to 105 degrees.

5. The outside wall cladding element according to claim 1, wherein the light-reflecting layer has a thickness of at least 10 micrometers.

6. The outside wall cladding element according to claim 1, wherein the light-reflecting layer reflects incident light at an angle φ (phi) which differs from an angle of incidence α (alpha) by at least 3 degrees.

7. The outside wall cladding element according to claim 6, wherein the light-reflecting layer is provided with a knurled, textured surface.

8. The outside wall cladding element according to claim 7, wherein the light-reflecting layer comprises a plate material which has been deformed into a knurled shape.

9. The outside wall cladding element according to claim 7, wherein the light-reflecting surfaces have a hue of color.

10. The outside wall cladding element according to claim 1, wherein the outside wall cladding element is provided with ventilation.

11. The outside wall cladding element according to claim 1, wherein the top side is oriented to reflect virtually no light to the bottom side.

12. The outside wall cladding element according to claim 11, wherein the top side (21) has an emissivity which is less than 30%.

13. The outside wall cladding element according to claim 1, wherein interior surfaces of the panel-shaped material opposite the top and bottom sides define a hollow space therebetween that is configured to adjoin the outside wall.

14. An outside wall provided with an outside wall cladding element according to claim 1.

15. A method comprising mounting the outside wall cladding element according to claim 1 on the outside wall.

16. The outside wall cladding element according to claim 1, wherein the light-reflecting layer has a reflection coefficient of more than 50% and the light-absorbing layer has a reflection coefficient of less than 50% and absorbs more than 50% of incident light.

* * * * *